(12) United States Patent
Braunecker et al.

(10) Patent No.: US 6,671,058 B1
(45) Date of Patent: Dec. 30, 2003

(54) METHOD FOR DETERMINING THE POSITION AND ROTATIONAL POSITION OF AN OBJECT

(75) Inventors: Bernard Braunecker, Rebstein (CH); Beat Aebischer, Heerbrugg (CH); Raphael Appius, Berneck (CH)

(73) Assignee: Leica Geosystems AG (CH)

( * ) Notice: Subject to any disclaimer, the term of this patent is extended or adjusted under 35 U.S.C. 154(b) by 345 days.

(21) Appl. No.: 09/666,834

(22) Filed: Sep. 21, 2000

Related U.S. Application Data (63) Continuation-in-part of application No. PCT/EP99/02041, filed on Mar. 22, 1999.
(60) Provisional application No. 60/192,882, filed on Mar. 29, 2000.

(30) Foreign Application Priority Data

Mar. 23, 1998 (DE) .......................... 198 12 609

(51) Int. Cl.[7] .............................................. G01B 11/14
(52) U.S. Cl. ...................................................... 356/616
(58) Field of Search .............................. 356/3.01–3.09, 356/4.01–4.09, 3.1–3.16, 5.01–5.09, 5.11–5.15, 6–22, 614–640

(56) References Cited

U.S. PATENT DOCUMENTS 4,652,917 A    3/1987   Miller
5,440,392 A    8/1995   Pettersen et al.

FOREIGN PATENT DOCUMENTS

| DE | 3424806 C2 | 8/1985 |
| DE | 4438759 C1 | 11/1995 |
| DE | 19530788 C1 | 8/1996 |
| WO | WO 90/07096 A1 | 6/1990 |
| WO | WO 95/27918 A2 | 10/1995 |

OTHER PUBLICATIONS

G. Nagy, A. Falsafi: Using Vanishing Points to Locate Objects with Six Degrees of Freedom, 1988, pp. 123–139.
H.S. Stiehl et al, "Sichtsysteme für Industrieroboter," Hqndbuch Der Modernen Datenverarbeitung, 1984, pp. 65–90, Jahrgang, Heft 115, Forkel–Verlang.

Primary Examiner—Tu T. Nguyen
(74) Attorney, Agent, or Firm—Rothwell, Figg, Ernst & Manbeck, pc (57) ABSTRACT

The invention relates to a method for determining the spatial and rotational positions of an object. With the assistance of an imaging optical system, the object is mapped and detected on a high-sensitivity resolution optoelectronic detector. The location parameter of the object, such as the position vector ($\vec{r}_0$), the direction vector ($\vec{v}$) of the object axis, and the angle ($\kappa$) of rotation of the object around the object axis is determined from the planar position of the mapped object structures in the coordinate system ($X_{Det}$, $Y_{Det}$) of the detector by means of geometric optical relationships and mathematical evaluation methods. With this, the spatial position of the object is determined in a quick and contactless manner.

28 Claims, 8 Drawing Sheets

METHOD FOR DETERMINING THE POSITION AND ROTATIONAL POSITION OF AN OBJECT

CROSS REFERENCE TO RELATED APPLICATIONS

This application is a continuation-in-part of International Patent Application No. PCT/EP99/02041, filed Mar. 22, 1999. This application also claims priority from U.S. Provisional Patent Application No. 60/192,882, filed on Mar. 29, 2000. The disclosures of the above-referenced applications are incorporated herein by reference in their entirety.

BACKGROUND OF THE INVENTION

1. Field of the Invention

The invention relates to a method for determining the position and rotational position of an object in three-dimensional space.

The objects suitable for the invention are varied and are very different in their function and application. Examples of such objects are surgical microscopes and surgical tools in the medical sector, levelling staffs in geodetic surveying, gun barrels in the military sector or aerials, in particular directional aerials and radar aerials. In the case of such objects, their position in space plays an important role. This is determined in a specified coordinate system completely by six real position parameters which are composed of three parameters for the position (translation group) and three parameters for the rotational position (rotation group). The position of the object is given by the 3-dimensional coordinates of a point selected on the object. The rotational position of the object is generally described by the direction vector of a defined object axis and the angle of rotation of the object about the object axis. The direction vector of the object axis is a unit vector having the length 1, i.e. the sum of the squares of its components is 1.

2. Description of the Background Art

WO 95/27918 describes an arrangement for determining the spatial position of a surgical microscope with the aid of coded light signals which are emitted by light emitting diodes, preferably in the infrared range, and received by light receivers. A surgical microscope is generally mounted on an arm by means of a cardan joint and can be moved translationally in three directions in space and rotated about three directions in space so that its position in space can be adjusted as desired. On the surgical microscope, the light emitting diodes or optical fibres which are fed with light from the light emitting diodes are mounted at specific points. Alternatively, reflectors may also be mounted on the surgical microscope. The light receivers are arranged at various points in space and receive the light signals specific to each of them. From this, the spatial position of the surgical microscope is determined. If the spatial position of the patient is simultaneously known, the coordinates of the operating site viewed through the surgical microscope are thus known, which is indispensable for microsurgery.

In geodetic surveying, levelling staffs are used for determining vertical points of reference and for topographical surveying. They are also used in construction surveying and in the construction of traffic routes. A levelling staff is sighted with the telescope optical system of the levelling instrument in order to measure the difference in height between levelling instrument and levelling staff. It is assumed that the levelling staff is aligned perpendicular to the optical axis of the telescope. Since the optical axis of the telescope is usually adjusted so that it is in a horizontal plane, an operator must keep the levelling staff aligned as far as possible perpendicular with the aid of the water levels mounted thereon. Tilting of the levelling staff results in an error in the height measurement.

With the advent of automated digital levelling instruments according to DE 34 24 806 C2, electronic reading of the staff became possible for the first time. For this purpose, the levelling staff has a code pattern comprising black and white elements, a part of which is produced as an image on a position-resolving detector with the aid of the telescope optical system of the electronic levelling instrument. Here, the code pattern information present in the field of view of the telescope is used to obtain the desired height measurement by comparison with the code pattern of the levelling staff, which pattern is stored as a reference code pattern in the levelling instrument. Although the measured code pattern is identified in this measurement and evaluation method, tilting of the levelling staff and the resulting contribution to the inaccuracy of measurement are not taken into account.

A specific code pattern is disclosed in DE 195 30 788 C1. A levelling staff having a rotationally symmetrical cross-section has, on its lateral surface, code elements which form lines closed rotationally symmetrically with respect to the longitudinal axis of the levelling staff. Consequently, the code pattern is visible from all sides.

DE 44 38 759 C1 describes a method for determining the tilt angle of coded levelling staffs in the measuring direction by means of an electronic levelling instrument. The tilt of the levelling staff is taken into account exclusively in the measuring direction, i.e. in the observation direction. The resulting recording of the code pattern on the detector is evaluated and the tilt angle is determined. Lateral tilting of the levelling staff, which thus takes place transversely to the observation direction of the levelling instrument, is however not taken into account. A one-dimensional diode array is therefore adequate as a detector.

Owing to a lateral tilt of the levelling staff, an error also occurs in the height and distance measurement. The point of intersection of the optical axis of the levelling instrument with a tilted levelling staff is further away from the bottom of the levelling staff than in the case of exactly perpendicular alignment of the levelling staff. An insufficiently perpendicular alignment due to inaccurate reading of the water level by the operator therefore leads to erroneous measurements. There is subsequently no possibility for correcting errors. Moreover, often only a single operator is used today, said operator operating the levelling instrument for surveying. The levelling staff standing alone is exposed to the wind, which leads to corresponding deviations in the surveying.

In the case of a gun barrel—and the following statement also applies analogously in the case of directional aerials and radar aerials—the primary concern is to determine its orientation in space or to rotate the gun barrel into a specific predetermined direction and to measure said rotation. The horizontal and vertical angular position (azimuth and elevation) of the gun barrel is controlled with the aid of encoders which are mechanically connected to the gun barrel. The encoders contain in general coded rotary discs which execute a rotational movement by means of a gear during rotation of the gun barrel and thus deliver electrical signals corresponding to the angles of rotation. The mechanical play is disadvantageous in the case of such controls. Moreover, the large thermal loads and shocks lead to inaccuracies and to increased wear.

SUMMARY OF THE INVENTION

It is the object of the invention to provide a method by means of which the position and the rotational position of an object in three-dimensional space can be determined quickly and without contact.

The object is achieved, according to the invention, by use of an optical measuring head including an imaging optical system and a detector which is position-resolving in two dimensions and is arranged in the focal plane of the imaging optical system. The object with its object structures is focused onto the detector by the imaging optical system. The object structures are known from the outset as a priori information. The object structures may contain the geometric shape of the object and its dimensions or may be marks at specific points on the object or they may be a code pattern which is applied to the object. The image of the object or of the object structures which is present in two-dimensional form on the detector is evaluated in an evaluation unit connected to the detector.

There are various possibilities for evaluating the two-dimensional image information. For example, the image of the object can be compared with calculated images. From the known geometry of the object or from existing marks on the object or from an existing code pattern on the object or from all these object structures together, the expected detector image can be calculated using the known properties of the imaging optical system (and optionally the resolution of the position-resolving detector) for any reasonable values of the six position parameters stated at the outset. Optimization methods are used for determining those values of the position parameters which give the best or at least a sufficiently good agreement between the calculated image and the image actually recorded. Such optimization methods are, for example, quasi-Newton methods (determination of the least squares or of the maximum likelihood, etc.), which are known from K. Levenberg: "A Method for the Solution of Certain non-linear Problems in Least Squares", Quart. Apl. Math. 2 (1944), pp. 164–168, or from D. W. Marquardt: "An Algorithm for Least-squares Estimation of Nonlinear Parameters", SIAM J. Appl. Math. 11 (1963), pp. 431–441, or from J. J. Moré: "The Levenberg-Marquardt Algorithm: Implementation and Theory", Numerical Analysis, ed. G. A. Watson, Lecture Notes in Mathematics 630, Springer Verlag (1978), pp. 105–116.

Another possibility for evaluation is to analyze the object structures focused on the detector with respect to their geometrical parameters and to determine the position parameters of the object therefrom. Thus, the planar position and the rotational position of the focused geometrical shapes (e.g. edge contours) or of the code pattern on the detector and the variation in the image scale changing as a function of the detector coordinates are first measured and determined. If a code pattern is present, all code elements of the code pattern focused on the detector are preferably completely used since high accuracy and especially high ruggedness and stability of the evaluation result can thus be achieved. For other requirements, such as, for example, for particularly rapid availability of the results of the measurement, however, the evaluation of only three decoded code elements of the code pattern is sufficient. The accuracy of the measurement is somewhat limited. Alternatively, it is also possible to evaluate only the focused edge contours of the object.

From the determined geometrical parameters of the detected object structures, the position parameters of the object are determined with the aid of the optical imaging equation and geometrical relationships (vector algebra). By means of the position parameters, which as mentioned at the outset include the position vector, the direction vector of the object axis and the angle of rotation of the object about the object axis, the spatial position of the object, i.e. the position and rotational position, is reconstructed.

Of course, said possibilities for evaluation can also be combined with one another. For example, a rough determination of the position parameters can be effected by a rough evaluation of the edge contours or of only a few code elements and an accurate evaluation including the total recorded object geometry or all recorded code elements can follow. For the accurate evaluation, in particular the optimization method cited above can also be used and the position parameters determined from the rough evaluation can be employed as starting parameters for the optimization.

Expediently, a three-dimensional Cartesian coordinate system is chosen for determining the spatial position of the object. The coordinates of the measuring head and hence of the detector are known in this coordinate system. The coordinate system may also be chosen from the outset so that it agrees with the detector coordinates. Of course, the position parameters of the object can be converted into any desired expedient coordinate system. In particular, the rotational position of the object may also be specified by two polar angles or by azimuth, elevation and in each case the angle of rotation of the object about the axis of rotation or by three Eulerian angles.

An optoelectronic detector capable of position resolution in two dimensions is required for the invention. Said detector may be, for example, a video camera or two-dimensional CCD array. However, it is also possible to use a plurality of one-dimensional CCD arrays arranged side by side. The object is mapped with such a detector and by means of the imaging optical system. The object structures present in the field of view of the imaging optical system are focused and detected. The detector is adjusted with its light-sensitive detector surface generally perpendicular to the optical axis of the imaging optical system. The point of intersection of the optical axis with the light-sensitive detector surface may define the zero point of the coordinate system of the detector.

When a CCD detector having discrete light-sensitive pixel structures is used, the positional resolution of the CCD detector can be further considerably increased by means of suitable optic structures, in particular by means of suitable structures of a code pattern. More than 10 times the pixel resolution of the detector is thus achievable. The particular measurement sensitivity is obtained if the fundamental spatial frequency or one of the higher harmonic spatial frequencies of the intensity distribution caused by the code pattern on the detector forms a low-frequency superposition pattern together with the fundamental spatial frequency of the radiation-sensitive structures of the detector. The low-frequency superposition pattern acts in the same way as a moirépattern. Moiré patterns are known to be very sensitive to a shift in the structures which produce them. Here, this means that, even in the case of a very small change in the intensity distribution on the detector compared with its pixel structure, the low-frequency superposition pattern changes considerably in its spatial frequency. Thus, the position of the focused code pattern on the detector can be measured very precisely. Since a change in the superposition pattern is caused by a change in the position and rotational position of the object, the position parameters of the object in space can therefore be measured in a very sensitive and hence highly precise manner.

If the object is a levelling staff, the direction vector of its axis is also important in addition to its position, since said vector describes the tilt of the levelling staff from the perpendicular. In addition to the known conventional levelling staffs where a code pattern is applied to a flat surface, it is also possible to use a levelling staff which is rotationally symmetrical with respect to its longitudinal axis and has a rotationally symmetrical bar code. In this case, the imaging optical system can pick up the same code pattern even continuously from all sides of the levelling staff. By determining the direction vector of the levelling staff axis from the focused code pattern or the detected contours of the levelling staff, both the inclination of the levelling staff in the direction of view of the imaging optical system and the lateral inclination of the levelling staff transverse to the direction of view of the imaging optical system are determined. Thus, the deviation of the levelling staff from the ideal perpendicular is determined and is taken into account in a corresponding correction for the surveying. This correction is made automatically in every survey. Consequently, it is even possible to dispense with prior alignment of the levelling staff. As a result, fast and precise surveying with only a single operator and also independently of the wind conditions is possible. If moreover, in the given case, the angle of rotation of the levelling staff about its axis is also determined—assuming a suitable code pattern or specific marks—this automatically also gives the sighting direction of a movable measuring head.

If the object is a gun barrel, this can be equipped with various code patterns, analogously to the case of the levelling staff. If only elevation and azimuth of the gun barrel are to be determined, a code pattern rotationally symmetrical with respect to the longitudinal axis of the gun barrel or only the edge contour of the gun barrel is sufficient. If a code pattern comprising code lines aligned parallel to the longitudinal axis is additionally applied to the gun barrel, its angle of rotation about its axis can additionally be determined. The code lines may also be stochastically oriented. Combinations of these code patterns in which, for example, segments having rotationally symmetrical code rings and segments having parallel or stochastic code lines alternate can also be used. A code pattern which is wound in a spiral manner around the gun barrel and with which about the same sensitivity for the direction vector of the gun barrel axis and the angle of rotation of the gun barrel about its axis can be achieved is also advantageous. However, it is also possible to use a code pattern having a completely irregular structure, as possessed, for example, by military camouflage patterns. What is decisive for all code patterns is that they are either known per se or are determined by surveying. Advantageously, such code patterns can be readily used for the correlation procedures.

By means of the imaging optical system, the contours of the gun barrel and/or of the code pattern are recorded and the rotational position of the gun barrel is determined without contact. Optionally, the gun barrel can be actively illuminated, for example with infrared light. The gun barrel or the applied code pattern may also be luminescent. Generally firm locking of imaging optical system and detector relative to the gun barrel and the optical surveying result in the great advantage that absolutely no mechanically moving components are required for determining azimuth, elevation and angle of rotation of the gun barrel. This contactless measurement takes place rapidly and gives precise results.

If the object is an aid used in the medical environment, in particular in automated microsurgery, such as, for example, a surgical microscope, a surgical tool (scalpel, drill, endoscopic aid, etc.) or a radiation source for tumour treatment, good visibility of the object structures of the aid must be ensured for the measuring head. During handling of the aid, the latter may be temporarily concealed by persons or instruments and the direction of view of the measuring head interrupted. However, if it is intended constantly to measure the spatial position of the aid under these conditions, it is useful if the object structures to be detected by the measuring head are located in an exposed area of the aid so that they are as far as possible in the unobstructed direction of view of the measuring head. When a code pattern is used, it may also be applied to a plurality of points on the aid or it may even cover the entire surface of the aid. The measuring head may be movable in space for an optimal recording, or preferably a plurality of measuring heads distributed in space are used simultaneously. The redundancy of the results delivered by a plurality of measuring heads moreover meets the requirement set in the medical sector for particular equipment safety.

Otherwise, the object may also be the patient itself, i.e. more precisely a frame which is firmly connected to the patient and defines the coordinate system of the patient. Precisely in operations on tumours in the brain, such a frame is fixed to the patient's head, the spatial position of the tumour relative to the frame being determined, for example, by computed tomography images. If the geometric structures of the frame or the code patterns applied to the frame are recorded by the measuring heads and the spatial position of the frame is determined, the coordinates of the tumour are also known in the coordinate system of the measuring heads. Since moreover the spatial position of the surgical microscope and of the surgical tool is determined with the aid of the measuring heads, endoscopic navigation through the brain to the tumour can be performed fully automatically.

In all stated application examples of the invention, it is possible that it may be difficult to provide an object with a code pattern to be used or that the object is already present as a complete component. In such cases, it is possible to mount a separate body provided with a code pattern eccentrically on the object ("booster principle"). The body may have a cylindrical shape. It is of course also possible to mount a plurality of such bodies on one object. If the object moves in space, the separately mounted body, too, performs clearly coupled movements, in particular rotational movements so that the position and rotational position of the object can always be computed.

In addition, an object can also be recorded stereoscopically. For this purpose, either two measuring heads can form a stereo base or the stereo base is produced by a measuring head together with a focusing mirror or a plurality of focusing mirrors, so that the measuring head can record stereoscopic images of the object. By means of this additional image information, the accuracy of the position determination of the object can be further increased—analogously to seeing with two eyes.

Finally, a distance measuring instrument can also be connected to the measuring head or integrated therein. With such additional information about the distance of the object, it is also possible to increase the accuracy of measurement. Moreover, the additional information can ensure that the measured result regarding the position of the object is available more quickly.

BRIEF DESCRIPTION OF THE DRAWINGS

The embodiments of the invention are explained in more detail below with reference to the drawing.

DETAILED DESCRIPTION OF THE PREFERRED EMBODIMENTS

Figure 1:
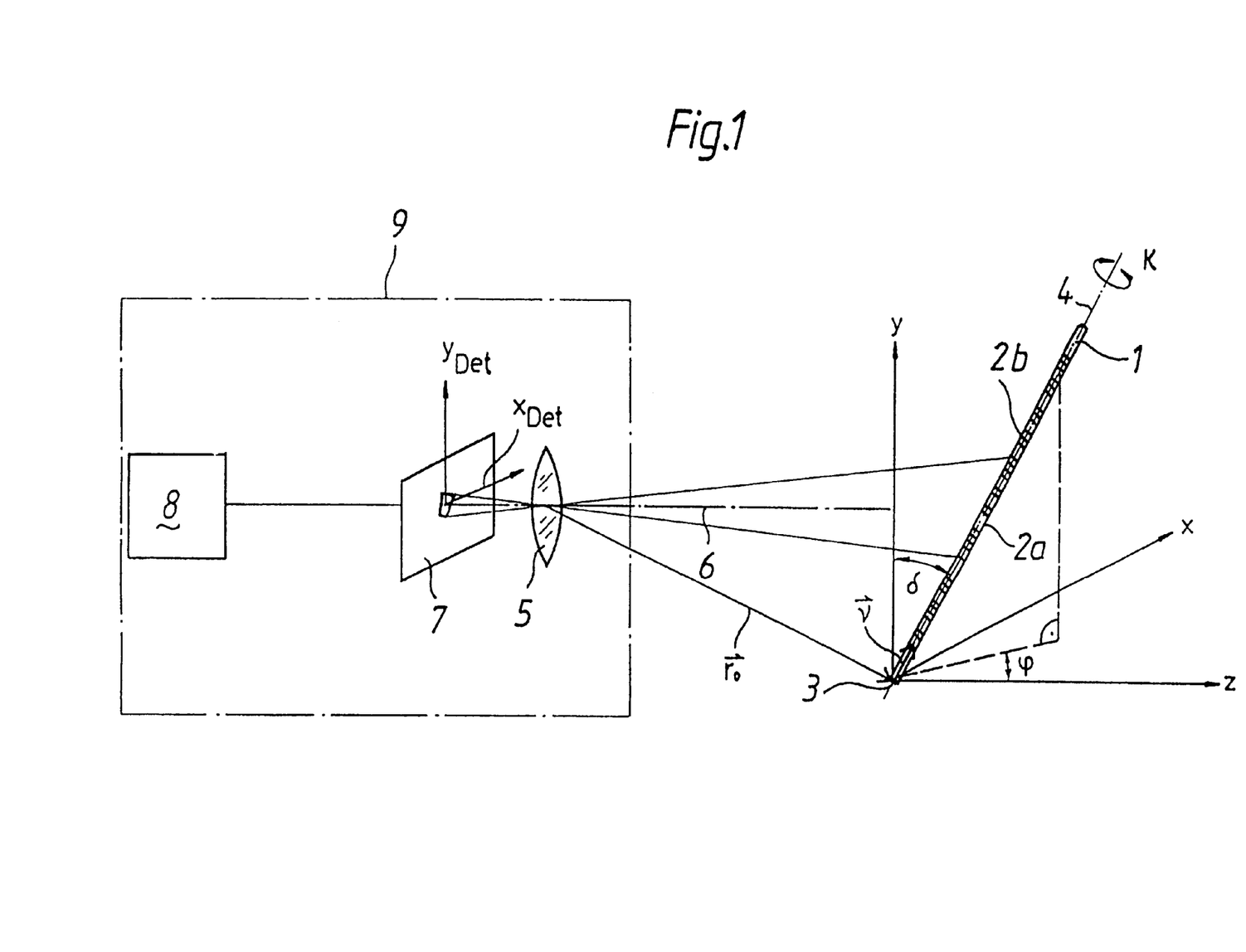
FIG. 1 shows a schematic representation of the rotational position of an object provided with a code pattern and the recording of the object structures by a measuring head comprising an optical imaging system and a position-resolving detector.

FIG. 1 schematically shows an object 1 in a Cartesian coordinate system x, y, z. The object 1 has a foot 3 and an object axis 4 and can be provided with a code pattern 2b. The object contours 2a and/or the code pattern 2b are either known from the outset or they are surveyed so that the size, shape and the spacing of the details of the object contours 2a and of the individual code elements of the code pattern 2b relative to the foot 3 of the object 1 are obtained. In the simplest case, the object contours 2a are straight lines. The object contours 2a shown in FIG. 1 are additionally rotationally symmetrical with respect to the object axis 4, and, in the special case, the angle of rotation κ of the object 1 about the axis 4 cannot be determined from the object contours 2a alone.

With the aid of an imaging optical system 5 present in a measuring head 9, that part of the object structures 2a, 2b present in the field of view of said optical system is focused onto a two-dimensional position-resolving optoelectronic detector 7. The electrical signals of the detector 7 are evaluated in an evaluation unit 8. According to the diagram in FIG. 1, the evaluation unit 8 is likewise integrated in the measuring head 9. In principle, the evaluation unit 8 can of course also be present outside the measuring head 9, for example in a separate electronics arrangement or in a computer (PC).

A coordinate system $x_{Det}$, $y_{Det}$ is defined in the light-sensitive detector plane of the detector 7, the origin of said coordinate system being chosen at the point of intersection of the optical axis 6 of the imaging optical system 5 with the detector plane. The optical axis 6 arranged perpendicularly to the detector plane is lying parallel to the z axis of the coordinate system x, y, z. In the case of a horizontal imaging optical system 5, the y axis is simultaneously normal to the Earth's surface. Of course, other coordinate systems can also be used.

The position of the object 1 in space is uniquely determined by six position parameters. They arise from the components of the position vector $\bar{r}_0$, the components of the direction vector $\bar{v}$, which contains only two independent parameters owing to its unit vector property, and the angle of rotation κ of the object 1 about its axis 4. The position vector $\bar{r}_0$ points from the imaging optical system 5 to the foot 3 of the object 1. The direction vector $\bar{v}$ points in the direction of the object axis 4 and thus indicates its position in space. Instead of the direction vector $\bar{v}$, the position of the object axis 4 can also be described by the angle δ measured from the vertical y axis and the horizontal angle φ measured from the y-z plane. In the case of unique object contours 2a or a unique code pattern 2b, the angle of rotation κ about the object axis 4 can be determined. The angle of rotation κ can be measured, for example, from the plane defined by the position vector $\bar{r}_0$ and by the direction vector $\bar{v}$. Thus, the complete rotational position of the object 1 is determined.

According to the invention, the position parameters of the object 1 are determined from the planar position and the local mapping of the object structures 2a, 2b focused on the detector 7. Depending on the magnitude of the polar angles (φ, δ) and of the position vector $\bar{r}_0$, the position shown schematically in FIG. 1 and the mapping of the object structures 2a, 2b on the detector 7 change.

Figure 2:
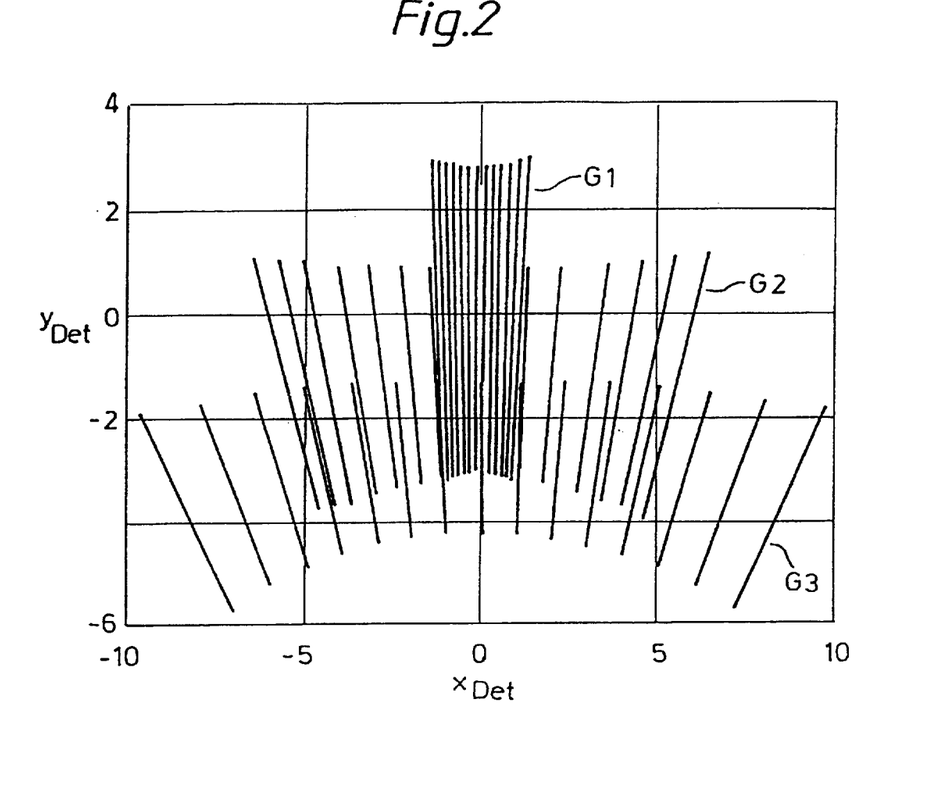
FIG. 2 shows a schematic representation of detector recordings of the object for different rotational positions.

In this context, images of the object 1 at various polar angles (φ, δ) on the detector 7 are shown schematically in FIG. 2. Each of the lines shown on the detector coordinate system $X_{Det}$, $Y_{Det}$ corresponds symbolically to the image of the same section of object 1 which is detected by the imaging optical system 5, in each case for a different pair of polar angles (φ, δ). The individual code elements of any code pattern 2b present are not shown here.

FIG. 2 reveals three groups of lines G1, G2, G3, which represent three different vertical angles δ. A small vertical angle δ can be assigned to group G1 in the upper region of FIG. 2, whereas a large angle δ gives rise to group G3. Within each group G1, G2, G3, the horizontal angle φ varies, correspondingly large negative or positive angles φ being assigned to the lines at positive and negative coordinate values, respectively, of $X_{Det}$.

The different lengths of the lines depending on φ and δ indicate different imaging scales according to the rotational position of the object 1. The imaging scale of the object structures 2a, 2b varies along each line since the object structures 2a, 2b are different distances away from the imaging optical system 5 owing to the rotational position of the object 1. The imaging scale is obtained from the quotient of the known sizes of the object structures 2a, 2b on the object 1 and the measured size of the object structures 2a, 2b on the detector 7. With the aid of the focal distance f of the imaging optical system 5, the distance between the imaging optical system 5 and the object structures 2a, 2b on the object 1 is calculated therefrom according to the laws of geometrical optics.

Figure 3:
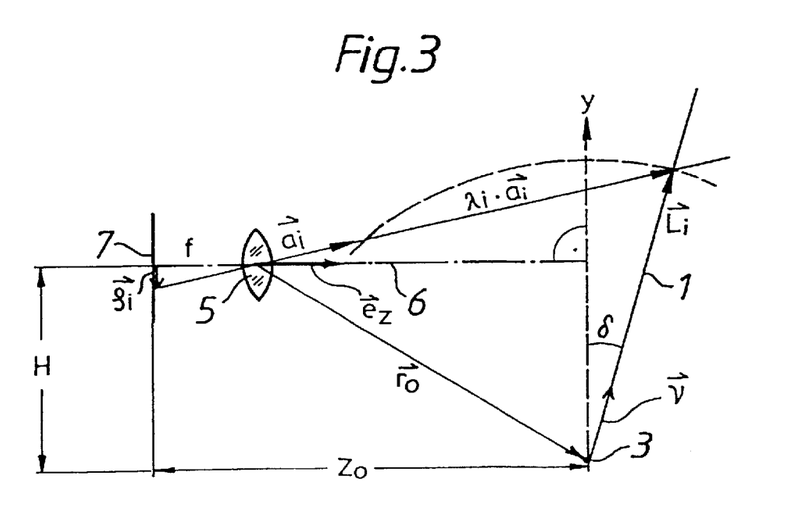
FIG. 3 shows a representation of geometrical relationships for determining the rotational position and the position vector of the object, FIGS. 4a, b show distortion of a code pattern at different elevation angles.

The geometrical situation in this context is shown in FIG. 3. To present the principle more clearly, the thickness of the object 1 is neglected. The sighting point can then coincide with the foot 3 and both are given by the position vector $\bar{r}_0$. The object structures 2a, 2b should in this case be a code pattern 2b. The i th code element of the code pattern 2b is located at a fixed, known distance $|\bar{L}_i|$ from the foot 3 of the object 1. It is assumed here that the number i of the code element is known; this can be obtained either by counting if the total code pattern 2b is focused on the detector 7 or by decoding a sufficiently long focused section of the code pattern 2b. The i th code element is focused on the detector 7 at a distance $|\bar{\rho}_i|$ from the optical axis 6 by the imaging optical system 5 having the focal distance f. The vectors $\bar{\rho}_i$ and $\bar{L}_i$ are three-dimensional, where $\bar{\rho}_i$ lies in the plane of the detector 7. In general, the vectors $\bar{\rho}_i$ and $\bar{L}_i$ are not located in the plane of the drawing in FIG. 3. Below, a distinction is made between two cases.

In a first case, the position vector $\bar{r}_0$ from the imaging optical system 5 to the foot 3 of the object 1 should be predetermined. The predetermined position vector $\bar{r}_0$ means that the imaging optical system 5 and the foot 3 of the object 1 are invariable relative to one another. The position vector $\bar{r}_0$ can be determined by a simple mechanical measurement or, in the case of higher requirements, also by laser surveying or by a calibration measurement in which the object 1 is present in a previously known spatial position. Such mutual fixing of measuring head 9 and object 1 may be the case, for example, when object 1 is a gun barrel. With the known position vector $\bar{r}_0$, the polar angles ($\phi$, $\delta$) of the gun barrel are determined, with the result that the latter can be brought or adjusted to a predetermined rotational position. Within the range of rotation of the gun barrel, code pattern 2 must be capable of being at least partly detected by the imaging optical system 5.

The distance $|\lambda_i \bar{a}_i|$ from the imaging optical system 5 to the i th code element of the code pattern 2 is determined in the following equations, where $$\bar{a}_i = f \cdot \bar{e}_{z-\rho i}$$

and $\bar{e}_z$ is the unit vector in the positive z direction. The vector $\bar{a}_i$ is thus known, while $\lambda_i$ is the multiplication factor to be determined. The following vector equation is applicable $$\bar{L}_i = \lambda_i \cdot \bar{a}_i - \bar{r}_0.$$

By calculating the square of the absolute value, the following quadratic equation for $\lambda_i$ is obtained:

$$|\bar{a}_i|^2 \cdot \lambda_i^2 - 2 \cdot (\bar{r}_0 \cdot \bar{a}_i) \cdot \lambda_i + |\bar{r}_0|^2 - |\bar{L}_i|^2 = 0.$$

There are thus two solutions for $\lambda_i$, which is shown in FIG. 3 schematically by the two points of intersection of the dashed arc with the direction of observation $\bar{a}_i$ to the i th code element. The uniqueness of the solution is established by mapping the i th code element on the detector 7. The mapping describes the deviation of the shape of the focused code element (or generally of object 1) from its shape which it has at the "zero point" (polar angles $\phi=0$ and $\delta=0$) of the object 1.

The three-dimensional coordinates of the vector $\bar{L}_i$ are obtained on the basis of the distance $|\lambda_i \bar{a}_i|$ to the i th code element, determined from the above equations, and of the vector $\bar{a}_i$ determined from the detected vector $\bar{\rho}_i$. This immediately gives the direction vector $$\bar{v} = \frac{\bar{L}_i}{|\bar{L}_i|},$$

from which the polar angles ($\phi$, $\delta$) can easily be calculated by means of trigonometrical functions. Thus, when position vector $\bar{r}_0$ is known, the measurement of a single code element is sufficient for calculating the polar angles ($\phi$, $\delta$). The accuracy of the polar angle calculation can of course be substantially increased by including more code elements of the code pattern 2b. If in addition a code pattern 2b unique with respect to the angle of rotation κ is applied to the object 1, the angle of rotation κ of the object 1 about its axis 4 can also be determined from the focused code pattern 2b. Thus, the total rotational position of the object 1 is determined rapidly, precisely and without contact.

In a more extensive second case, the measuring head 9 and the object 1 are to be spatially variable relative to one another. In this case, the position vector $\bar{r}_0$ is also unknown in addition to the rotational position. The additional determination of the position vector $\bar{r}_0$ is essential particularly when the object 1 is a levelling staff, a surgical microscope or a surgical tool (and can of course also be performed in the case of the above-mentioned gun barrel) In the case of surveys, the position vector $\bar{r}_0$ —in particular the distance $Z_0$ and the height H of the imaging optical system 5 from the foot 3 of the levelling staff—is even the measured quantity of actual interest. If at the same time the direction vector $\bar{v}$ of the levelling staff always deviating slightly from the exact perpendicular is determined, this has the advantageous effects, mentioned further above, on the accuracy of the surveying and the handling during the levelling process. It is even possible deliberately to dispense with a perpendicular orientation of the levelling staff and to omit the application of a water level on the levelling staff. Finally, in the case of said medical aids for diagnosis, therapy or surgery, a knowledge of the position vector $\bar{r}_0$, of the direction vector $\bar{v}$ and of the angle of rotation κ is also important.

For simultaneous determination of $\bar{r}_0$ and $\bar{v}$, it is sufficient in principle to select only three code elements from the code pattern 2b focused on the detector 7, to determine their code numbers i and to apply the vector mathematics described by the above equations to these code elements.

It is of course advantageous for the accuracy and reliability of the result to use additional or all detected code elements for the evaluation and to apply the vector mathematics described. Moreover, generally known estimation and fit procedures from mathematics can be used. Moreover, the above vector equations can be solved with the aid of iteration procedures and similar mathematical methods.

Instead of the code elements of code pattern 2b, details of object contours 2a or marks on the object 1 can also be evaluated in an analogous manner.

Advantageously, the position parameters of the object 1 which have been determined in this manner can be used in subsequent optimization procedures and thus determined even more accurately. The position parameters are varied until the detector image of the object structures 2a, 2b which are calculated from the position parameters agree optimally with the image information actually detected. In principle, however, the optimization procedures can also be performed independently of preceding calculations.

Figure 4A:
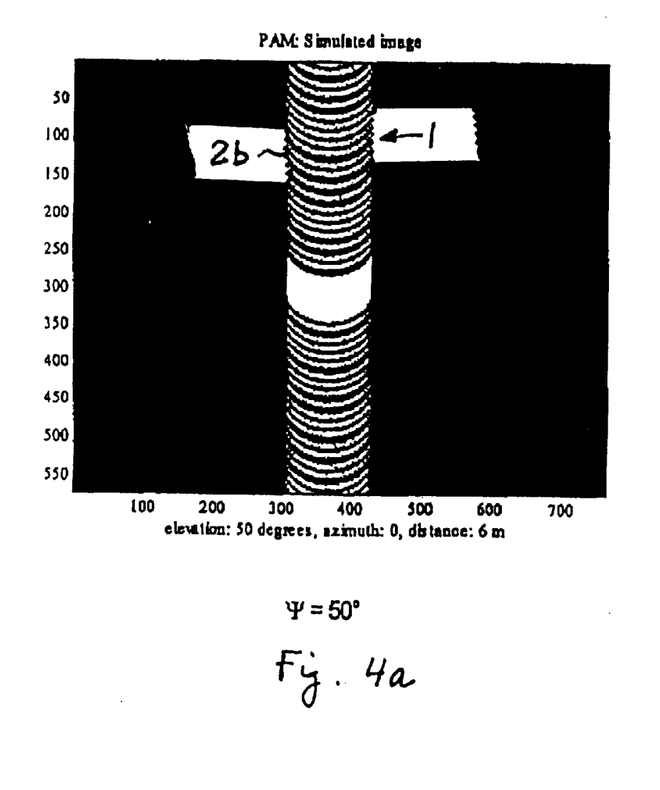
Figure 4B:
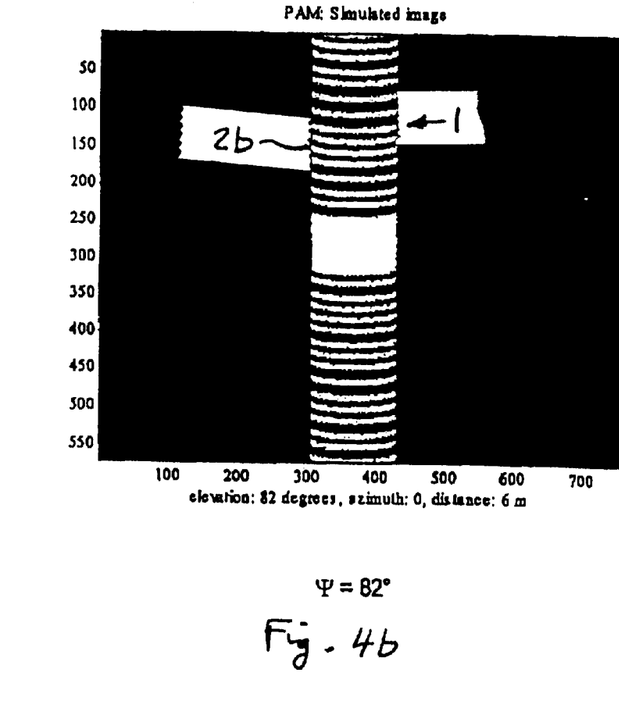

FIGS. 4a, b are simulated views of an object 1 at different elevation angles ψ showing distortion of a code pattern 2b.

Figure 5:
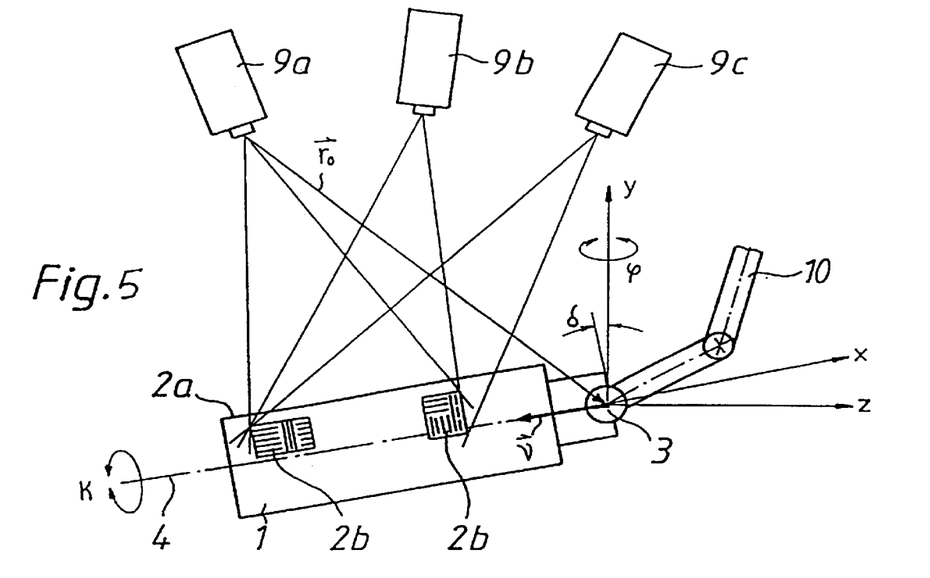
FIG. 5 shows a schematic representation of an object in the form of a medical aid and its recording by a plurality of measuring heads, FIGS. 6a, b shows separate bodies which are provided with a code pattern and are mounted on the object to be surveyed, FIGS. 7a, b, c show a schematic representation for the stereo recording of the object, FIGS. 8a, b show a schematic representation of the measuring head with a distance measuring instrument, and FIGS. 9a, b, c show embodiments of the invention providing both large and small field of view.

FIG. 5 schematically shows, as object 1, an aid for the medical sector whose spatial position and rotational position relative to a patient are of decisive importance. Thus, the object 1 may be a surgical microscope, a surgical tool, such as, for example, a scalpel, a drill, an endoscope, etc., or a frame firmly connected to the patient or a radiation source for tumour treatment. As shown schematically in FIG. 5, the object 1 may be provided with a code pattern 2b in a plurality of areas on its surface. The spatial position of the object 1 is changed, for example, with the aid of a swivel arm 10. Moreover, the object 1 is mounted on the swivel arm 10 so as to be rotatable at a pivot point 3 through the three angles $\phi$, $\delta$, κ, so that its rotational position, too, can be adjusted as desired. Thus, the object 1—for example in the case of a brain operation—can be brought into any desired required spatial position on the patient's head.

The object 1 can be picked up by a plurality of measuring heads 9a, 9b, 9c and the object structures 2a, 2b can be evaluated according to the above equations or with the aid of the optimization methods. For reasons of redundancy and because of the possible concealment of the object structures 2*a*, 2*b* by persons or instruments, a plurality of measuring heads 9*a*, 9*b*, 9*c* are arranged in space. The spatial coordinates of the pivot point 3 (position vector $\bar{r}_0$) and the rotational position φ, δ, κ of the object 1 can be determined relative to each measuring head 9*a*, 9*b*, 9*c*. Since the spatial positions of the measuring heads 9*a*, 9*b*, 9*c* relative to one another are known, the positional parameters of the object 1 can be transformed to a superior coordinate system, for example into the coordinate system of the patient. Thus, the exact spatial position of the surgical microscope or of the surgical instruments relative to the operating site can be displayed for the surgeon. In addition, the surgical instrument can be guided fully automatically.

Figure 6A:
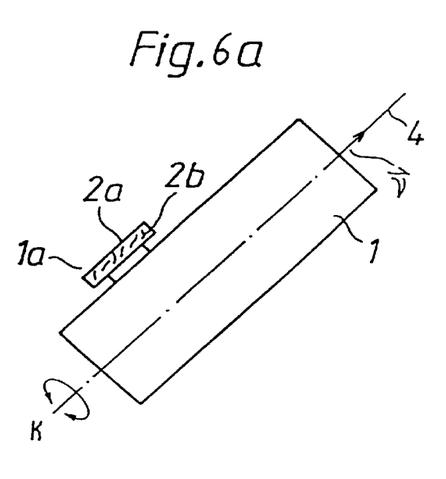
Figure 6B:
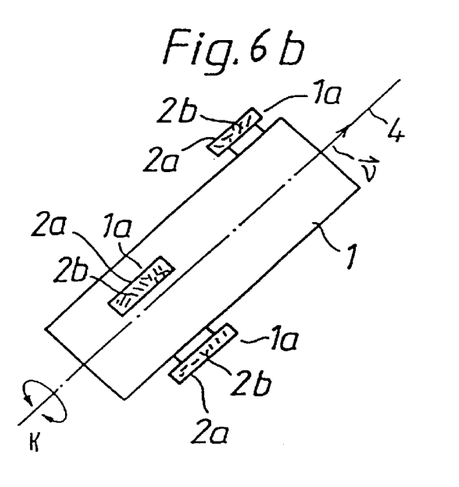

FIG. 6*a* schematically shows an object 1 on which a separate body 1*a* has been mounted. By means of the novel surveying and evaluation of the object structures 2*a*, 2*b* of the body 1*a*, the (6-dimensional) spatial position of the body 1*a* and hence also that of the object 1 are determined. Advantageously, an object 1 which has insufficient structures for an intended use can be subsequently equipped with a suitable body 1*a*. Optionally, the body 1*a* can also be readily removed again. Of course, a plurality of such bodies 1*a* can also be fastened to an object 1 (FIG. 6*b*).

Figure 7A:
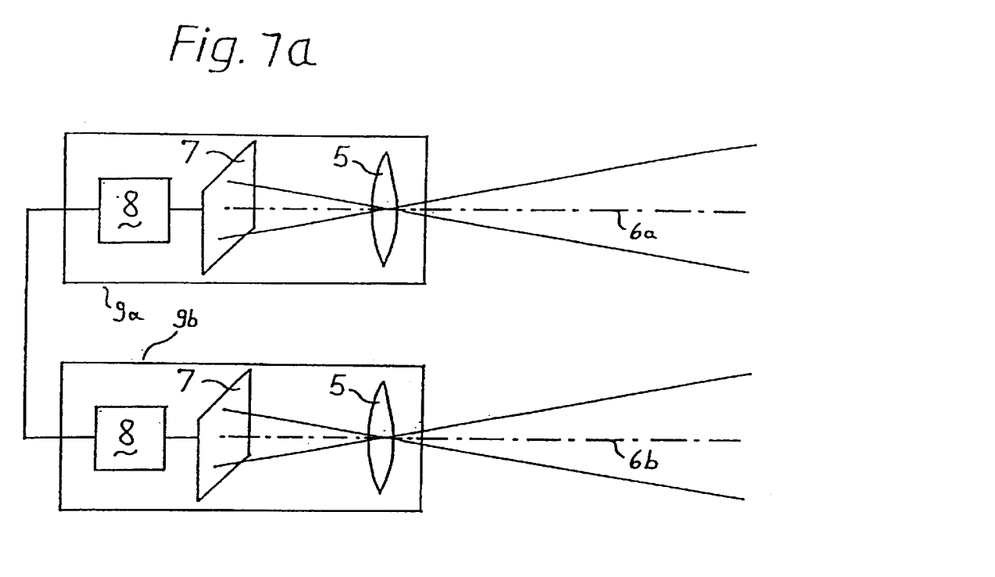

FIG. 7*a* shows a stereoscopic arrangement of two measuring heads 9*a*, 9*b*, which permit a high accuracy of the determination of the object position on the basis of the additional image information. The measuring heads 9*a* and 9*b* can on the one hand be firmly connected to one another so that the mutual position of their optical axes 6*a*, 6*b* is fixed. The axes 6*a*, 6*b* may make an angle with one another. Because little mounting work is required, they are preferably aligned parallel to one another. On the other hand, it may be advantageous to keep the two measuring heads 9*a*, 9*b* variable relative to one another and to make a suitable adjustment only when they are set up for surveying the object 1. If the object 1 is brought into an initial, previously known position, the mutual position of the optical axes 6*a*, 6*b* of the measuring heads 9*a*, 9*b* can be automatically set by self-calibration. Of course, the measuring heads 9*a*, 9*b* can if required be housed in a single housing.

Figure 7B:
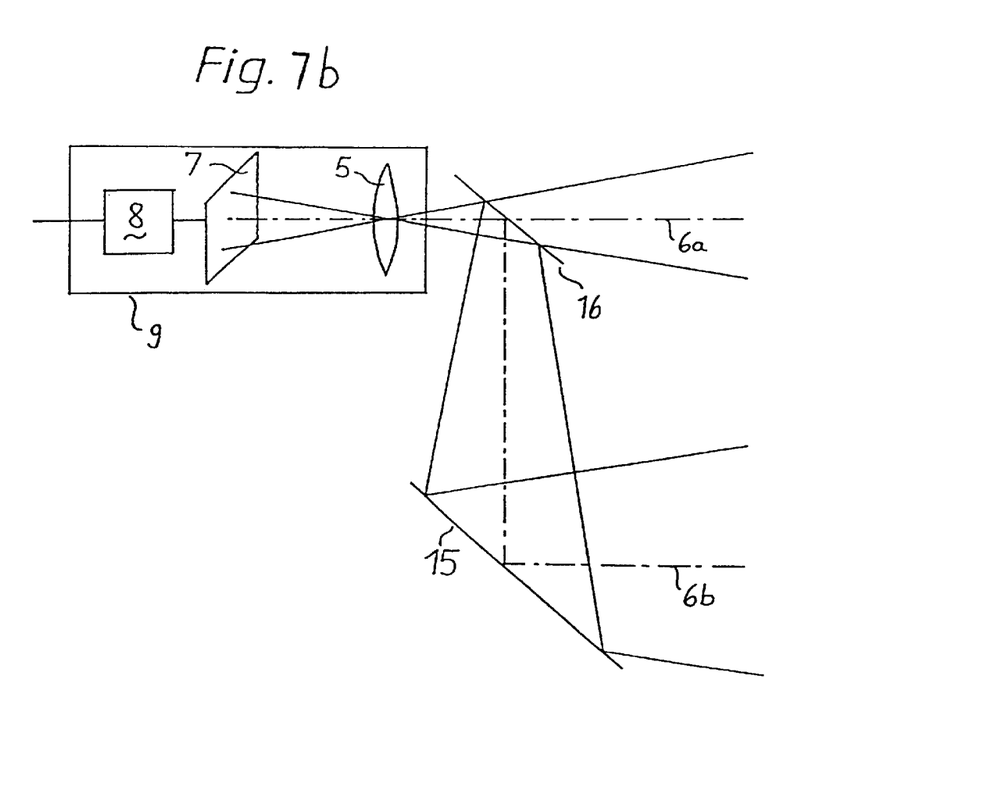

A variant of the stereoscopic arrangement is shown in FIG. 7*b*. Only one measuring head 9 is used, which picks up one partial stereo image directly and the other partial stereo image via a laterally arranged mirror 15. The coupling of the light picked up via this mirror 15 into the beam path of the measuring head 9 is effected either via a pivotable coupling mirror 16 which, depending on its position, lets through only one or only the other partial stereo image for image mapping with the detector 7 of the measuring head 9, or the coupling mirror 16 is controllable in its reflection and transmission properties, for example according to the function of an LCD shutter, in such a way that the two partial stereo images reach the detector 7 alternately at high transmission and at high reflection of the coupling mirror 16. On the other hand, it is possible to use a half-silvered coupling mirror 16 which transmits the two partial stereo images simultaneously to different detector regions of the detector 7 or to two separate detectors 7. This is possible with suitable tilting of the half-silvered mirror 16 and of an imaging optical system 5 tailored thereto.

Figure 7C:
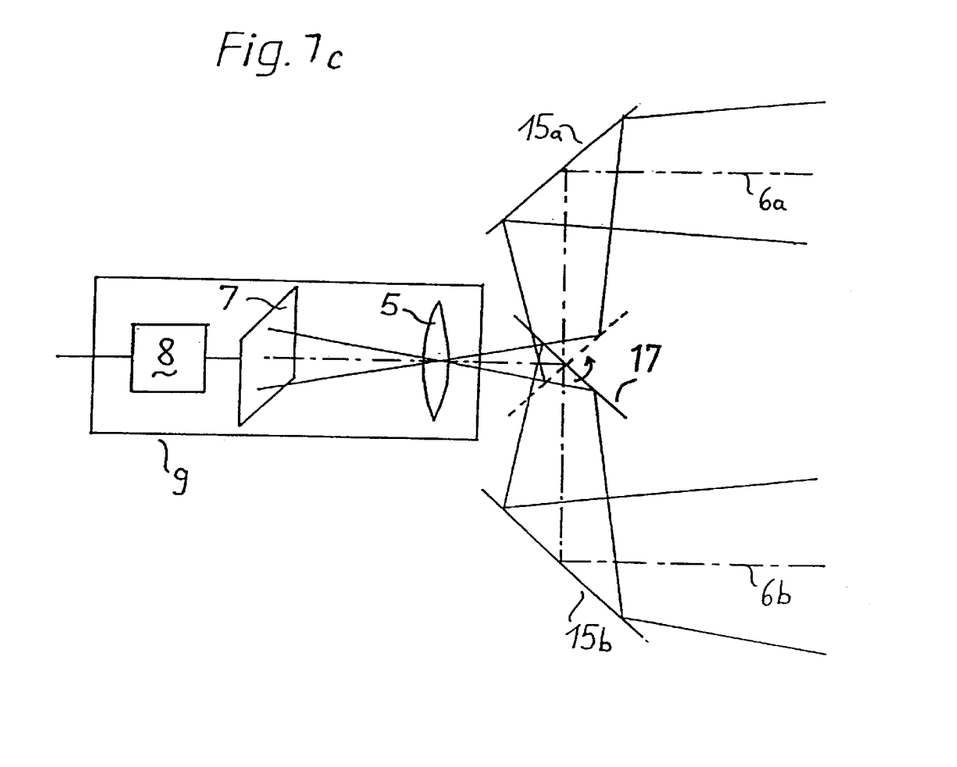

Of course, a stereo basis can also be generated by two mirrors 15*a*, 15*b* according to FIG. 7*c*, and the associated partial stereo images can be received alternately by the detector 7 via a rotatable mirror 17. The rotatable mirror 17 may also be replaced by a rotatable or fixed prism. In the case of the fixed prism or with a suitable mirror arrangement, simultaneous focusing of both partial stereo images onto different regions of the detector 7 can be effected.

Instead of the stereo imaging or in addition thereto, the distance to the object 1 can furthermore be determined using a distance measuring instrument 18, 18*a* and can be used as further measuring information in the evaluation. The measured distance value improves the accuracy and/or the rapidity of the evaluation for determining the position parameters for the object 1.

Figure 8A:
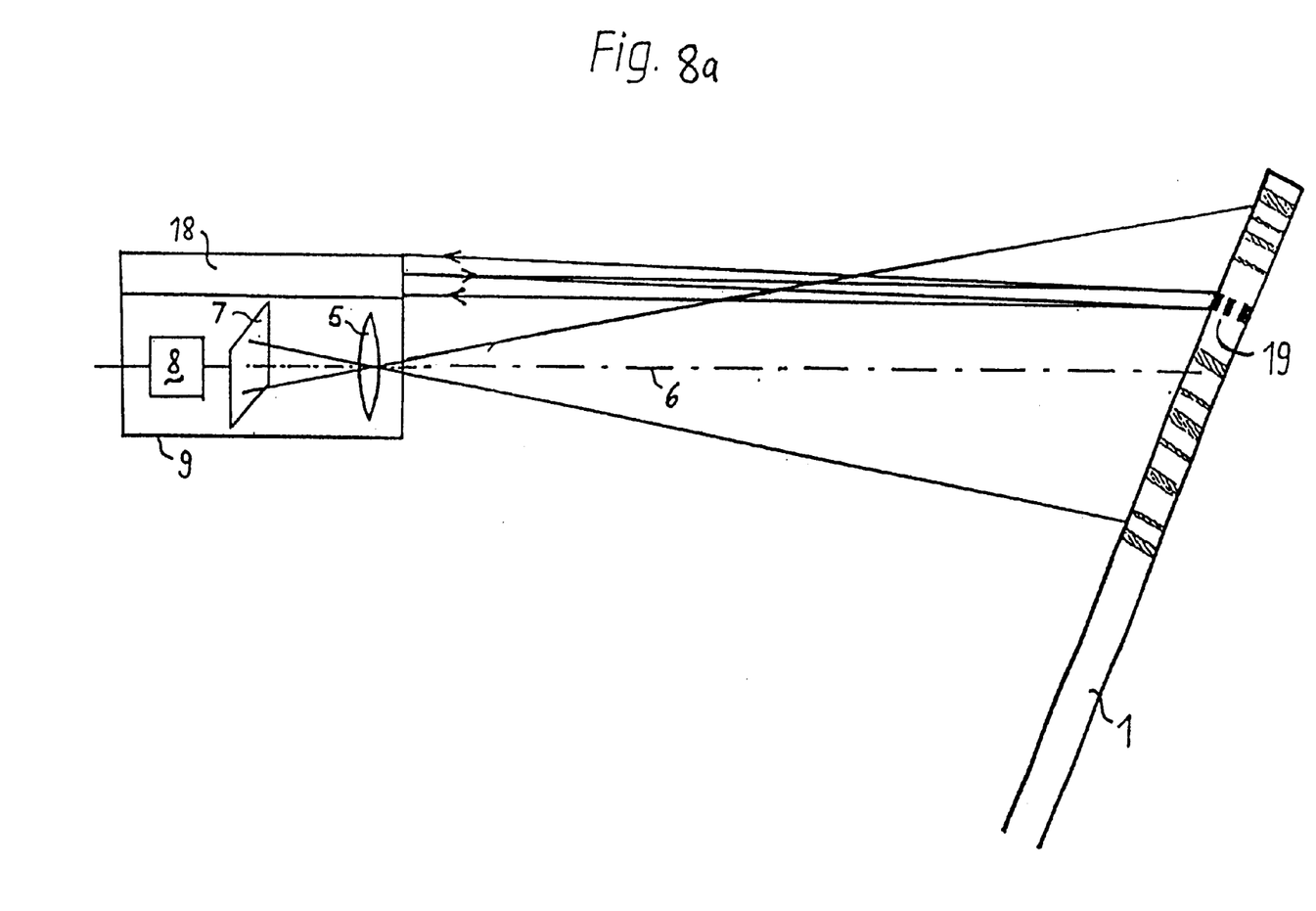

Electrooptical distance measuring instruments 18, 18*a* are preferred. They are connected as an independent device to the measuring head 9, for example according to FIG. 8*a*, or integrated in the measuring head 9, according to FIG. 8*b*. FIG. 8*a* furthermore schematically shows a cooperative target mark 19 (reflective foil, reflector, retroreflector, etc.) to which the distance is measured. Of course, the distance measurement is also possible without reflective aids and merely to the given surface of the object 1 as an uncooperative target.

Figure 8B:
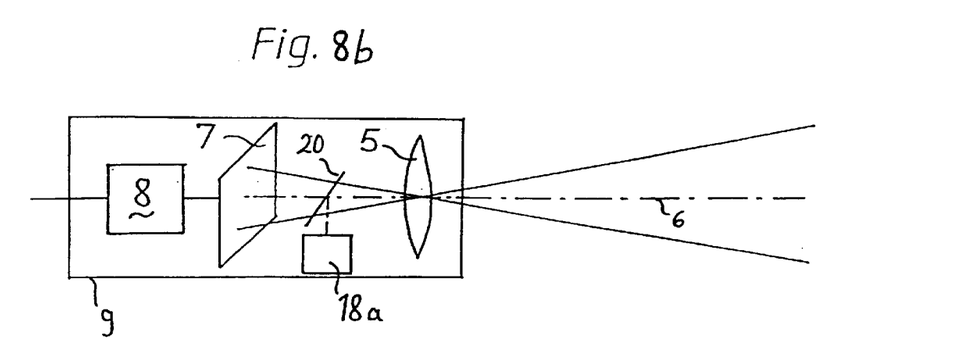

That version of an integrated distance measuring instrument 18*a* which is shown in FIG. 8*b* has the advantage that the imaging optical system 5 of the measuring head 9 can also be used and the distance along the optical axis 6 of the measuring head 9 can be determined. Coupling of the emitted light of the distance measuring instrument 18*a* into the optical beam path of the measuring head 9 or coupling out of the received light for detection in the distance measuring instrument 18*a* are effected, for example, via a half-silvered or wavelength-selective mirror 20.

The electrooptical distance measuring instrument 18, 18*a* is usually operated in the visible or infrared wavelength range. Wavelengths which are outside the sensitivity of the detector 7 of the measuring head 9 are preferred, or corresponding filters for the detector 7 and/or for the distance measuring instrument 18, 18*a* are used. With the use of a wavelength-selective mirror 20, the latter may optionally reflect the infrared light of the distance measuring instrument 18*a* particularly well and at the same time transmit the visible light to the detector 7 of the measuring head 9 particularly well. Otherwise, all types of electrooptical distance measuring instruments 18, 18*a* can be used, including those which have, for example, a biaxial design with separate transmitted and received beam path or which are of monoaxial design and simultaneously make use of the same optical setup for the transmitted and received radiation.

Figure 9A:
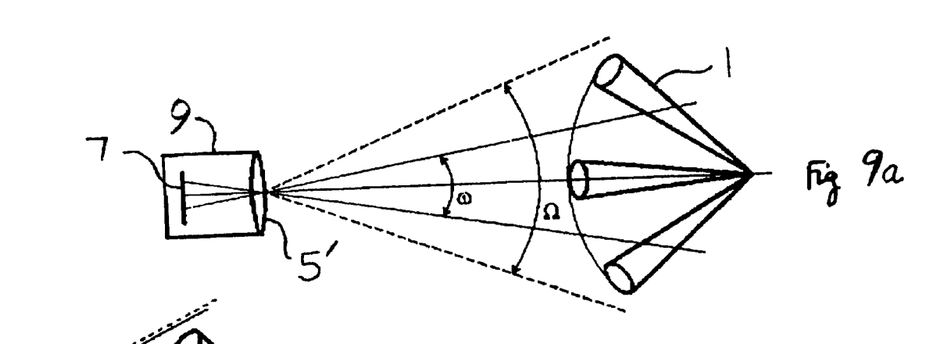
Figure 9B:
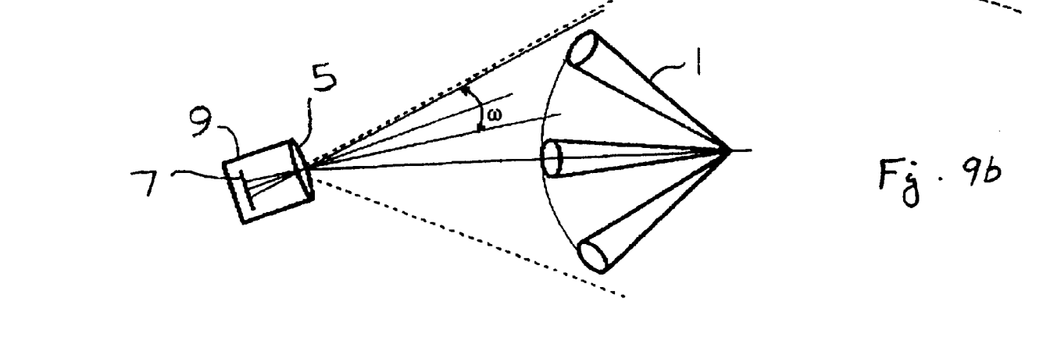
Figure 9C:
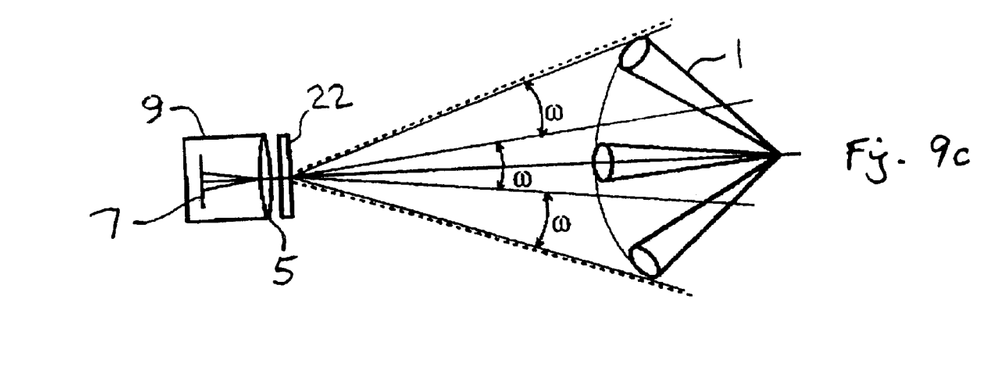

A problem encountered with target pointing, acquisition and tracking (PAT) is that the target 1 may move in a large angular range Ω as shown in FIGS. 9*a, b, c*. To cover the angular range Ω one would need a wide angle optical system, i.e. an imaging optical system with a large field of view (FOV) commensurate with the angular range of movement Ω. FIG. 9*a* shows how an object 1 under test can rotate azimuthally around 360°. If the distance between the object 1 and the position measuring device or head 9 has to be kept short by specifications, a large field of view Ω of the optics is needed to detect where the object is located (acquisition mode).

On the other hand, when the target is finally caught by the detector and the tracking mode is activated, an imaging optical system with a small field of view ω is advantageous. Then the target appears large on the detector, which increases the accuracy for determining the target position and in our case additionally, the target orientation. In other words, a small field of view ω is required to image the detected object with sufficient resolution on the detector of the position measuring device (detecting mode).

The above problems can be overcome in accordance with additional aspects of the present invention.

In FIG. 9*a*, a measuring head 9 is shown which is essentially the same as the measuring head previously described but with an imaging optical system 5' modified to include a zoom which allows variation of the angular magnification to obtain both a narrow and a large angular range (i.e., small and large FOV).

According to another embodiment shown in FIG. 9b, a measuring head 9 of the type described herein is configured as a tracking instrument (tracker), e.g., like a modern theodolite or goniometer. Although measuring head 9 has an imaging optical system 5 with a small field of view ω, in this embodiment the head mechanically scans a large field of view Ω. While overcoming the aforementioned problems, the tracking mechanics of such a system is presently slow and expensive.

Another embodiment of a measuring head 9 according to the present invention, shown in FIG. 9c, includes an optical system 5 with a small field of view ω and a pupil multiplexer made of several deflecting elements 22 (e.g., small prisms) placed side-by-side in the pupil of the optical system. Each deflecting element functions as a subpupil which images an angular segment ω on the detector to cover completely a large angular range Ω. This task is similar to prior German patent document No. DE 195 04 039 C1 disclosing a fixfocus level, where small prisms were placed side-by-side in the pupil. Each of the prisms deflects different depth-of-focus regions simultaneously on the detector 7. Some of the advantages of this system are that it requires no moving parts and offers immediate response. In the case where the object moves around a fixed pivot point, it is possible to determine the position of the object by making the prisms in such a way that the segments ω assigned to each prism slightly overlap one another. Then in any situation we have two target images with different orientation on the detector, from which the actual segment position can be uniquely deduced.

In the case of a free moving and free orienting target the situation is more complicated, but again can be solved. One possibility is to make the angular overlaps between two pupils variable. Then from the distance and the mutual orientation of both images on the sensor we can determine where the target actually is.

While the preferred embodiments of the invention have been disclosed in detail above, the invention is not intended to be limited to the embodiments as disclosed. Those skilled in the art may make numerous uses and modifications of and departures from the specific embodiments described herein without departing from the inventive concepts.

What is claimed is:

1. A method for determining the position and rotational position of an object with object structures of known dimension in three-dimensional space using an optical measuring head having an imaging optical system with imaging properties, an optoelectronic detector which is position-resolving in two dimensions, and an evaluation system, said method comprising the steps of collecting on the detector a focused image of that part of the object which is present in the field of view of the imaging optical system, feeding detected image information from the detector to the evaluation system, and using the evaluation system to determine at least one of the position and rotational position of the object in space, described by position parameters, by determining the position of focused object structures on the detector using the detected image information, determining an imaging scale based on the position of focused object structures on the detector relative to known dimensions of the object structures, and determining the position parameters by at least one of the following:

(1) calculating theoretical detector images for at least one set of position parameters using the imaging scale and imaging properties of the optical system, and choosing the position parameters which result in a calculated detector image which agrees with the detected image information; and (2) calculating the position parameters directly using the imaging properties of the optical system, the imaging scale, and geometric vector equations.

2. The method according to claim 1, wherein at least one of geometric shape of the object and marks on the object are recorded and evaluated as object structure by the measuring head.

3. The method according to claim 1, wherein a code pattern is applied to the object and is recorded and evaluated as object structure by the measuring head.

4. The method according to claim 1, wherein the object structures are applied as a code pattern on a separate body which is mechanically connected to the object.

5. The method according to claim 4, wherein a plurality of bodies provided with a code pattern are used and are mechanically connected to the object.

6. The method according to claim 1, wherein at least one of the object and the body are tubular.

7. The method according to claim 6, wherein the object structures are rotationally symmetrical with respect to the longitudinal axis of at least one of the object and the body.

8. The method according to claim 6, wherein the object structures are rotationally symmetrical with respect to, and parallel to, the longitudinal axis of at least one of the object and the body.

9. The method according to claim 1, wherein the object structures have a spiral shape.

10. The method according to claim 1, wherein the object structures are completely irregular but are unambiguously formed with respect to their position on at least one of the object and the body.

11. The method according to claim 1, wherein in order to improve the accuracy of measurement, the fundamental spatial frequency or a higher harmonic spatial frequency of the intensity distribution produced by the object structures on the detector forms, together with the fundamental spatial frequency of the radiation-sensitive structures of the detector, a low-frequency superposition pattern.

12. The method according to claim 1, wherein the object is illuminated.

13. The method according to claim 1, wherein a plurality of optical measuring heads for determining the spatial position of at least one object are simultaneously used.

14. The method according to claim 1, wherein the object is stereoscopically mapped.

15. The method according to claim 14, wherein the stereoscopic map is produced by one of (1) two optical measuring heads which are oriented relative to one another, and (2) one optical measuring head and at least more mirror which are aligned relative thereto.

16. The method according to claim 1, wherein the distance to the object is determined with the aid of a distance measuring instrument.

17. The method according to claim 16, wherein the distance measuring instrument is an electrooptic distance measuring instrument.

18. The method according to claim 1, wherein the position parameters describing at least one of the position and rotational position of the object are transformed into a superior coordinate system.

19. The method according to claim 1, wherein the object is an aid used in one chosen from medical diagnostics, therapy and operations.

20. The method according to claim 19, wherein the aid is one of a surgical microscope, a surgical tool, a frame connected to a patient, and a radiation source for tumour treatment.

21. The method according to claim 1, wherein the object is a levelling staff.

22. The method according to claim 1, wherein the object is one of a gun barrel, a directional aerial, and a radar aerial.

23. The method according to claim 1, wherein at least one of the object and the object structures is luminescent.

24. The method according to claim 1, wherein the imaging optical system includes a zoom, and further comprising the step of using the zoom to vary the field of view.

25. The method according to claim 1, wherein the imaging optical system has a field of view, and further comprising the step of moving the optical measuring head to scan a larger field of view.

26. The method according to claim 1, wherein the imaging optical system has a field of view, and further comprising the step of imaging a larger field of view by using a plurality of prisms, said prisms each imaging a portion of the larger field of view.

27. The method according to claim 26, wherein the prisms are configured such that imaged portions overlap one another.

28. The method according to claim 1, wherein a mathematical optimization method is used to vary the position parameters so that the calculated detector image agrees with the detected image information.

* * * * *